United States Patent [19]
Scheer et al.

[11] Patent Number: 6,030,155
[45] Date of Patent: Feb. 29, 2000

[54] DRILLING TOOLS FOR MACHINE TOOL AND METHOD OF PRODUCING THE SAME

[75] Inventors: Gerhard Scheer, Loechgau; Konstantin Baxivanelis, Besigheim, both of Germany

[73] Assignee: Komet Praezisonswerkzeuge Robert Breuning GmbH, Besigheim, Germany

[21] Appl. No.: 09/142,037

[22] PCT Filed: Feb. 26, 1997

[86] PCT No.: PCT/EP97/00901

§ 371 Date: Aug. 27, 1998

§ 102(e) Date: Aug. 27, 1998

[87] PCT Pub. No.: WO97/31742

PCT Pub. Date: Sep. 4, 1997

[30] Foreign Application Priority Data

Feb. 29, 1996 [DE] Germany .......................... 196 07 594

[51] Int. Cl.[7] .................................................. B23B 27/10
[52] U.S. Cl. .............................. 408/59; 408/57; 408/223; 408/230
[58] Field of Search .................................. 408/56, 57, 59, 408/223, 229, 230

[56] References Cited

U.S. PATENT DOCUMENTS

| | | |
|---|---|---|
| 1,747,117 | 2/1930 | Klein . |
| 2,322,894 | 6/1943 | Stevens ........................................ 77/70 |
| 4,904,130 | 2/1990 | Gorman ..................... 408/16 |
| 4,975,003 | 12/1990 | Hosoi ..................... 408/230 |
| 5,312,209 | 5/1994 | Lindblom ..................... 408/230 |
| 5,478,176 | 12/1995 | Stedt et al. ..................... 408/59 |
| 5,509,761 | 4/1996 | Grossman et al. ..................... 408/59 |
| 5,599,145 | 2/1997 | Reinauer et al. ..................... 408/233 |
| 5,634,747 | 6/1997 | Tukula et al. ..................... 408/59 |
| 5,676,499 | 10/1997 | Tukala ..................... 408/59 |

FOREIGN PATENT DOCUMENTS

| | | |
|---|---|---|
| 0 187 647 | 7/1986 | European Pat. Off. . |
| 0 549 548 | 6/1993 | European Pat. Off. . |
| 0 589 333 | 3/1994 | European Pat. Off. . |
| 0 642 863 | 3/1995 | European Pat. Off. . |
| 27 30 418 | 1/1979 | Germany . |
| 28 43 788 | 5/1979 | Germany . |
| 28 08 866 | 9/1979 | Germany . |
| 29 45 635 | 5/1981 | Germany . |
| 35 45 586 | 7/1987 | Germany . |
| 42 41 140 | 6/1994 | Germany . |
| 44 15 491 | 11/1995 | Germany . |
| 1 161 863 | 8/1969 | United Kingdom . |

OTHER PUBLICATIONS

Alber, P., and Guehring, K.: Schleifen von Wendelnuten ins Volle (1981); pp. 723–727.

*Primary Examiner*—Andrea L. Pitts
*Assistant Examiner*—Monica Smith
*Attorney, Agent, or Firm*—Flynn, Thiel, Boutell & Tanis, P.C.

[57] ABSTRACT

The invention concerns a drilling tool for machine tools. The drilling tool comprises a drill body with two chip-conveying grooves which are delimited at their flanks by helically curved ribs. Disposed at the end of the drill body is a drill head which comprises two segment parts, which are separated from each other by opposite axially aligned chip spaces, and two cutting plates which are each disposed in a recess in the segment parts in the region of an axially parallel radial chip-guide surface at different radial spacings from the drill axis with mutually partially overlapping working regions. At a transition point, the chip-guide surfaces merge into the flanks of the adjacent chip-conveying grooves. Disposed at at least one of the transition points is a transition surface which is gradually recessed so that it widens the cross-section of the chip space and merges into a flank of the adjacent chip-conveying groove.

30 Claims, 7 Drawing Sheets

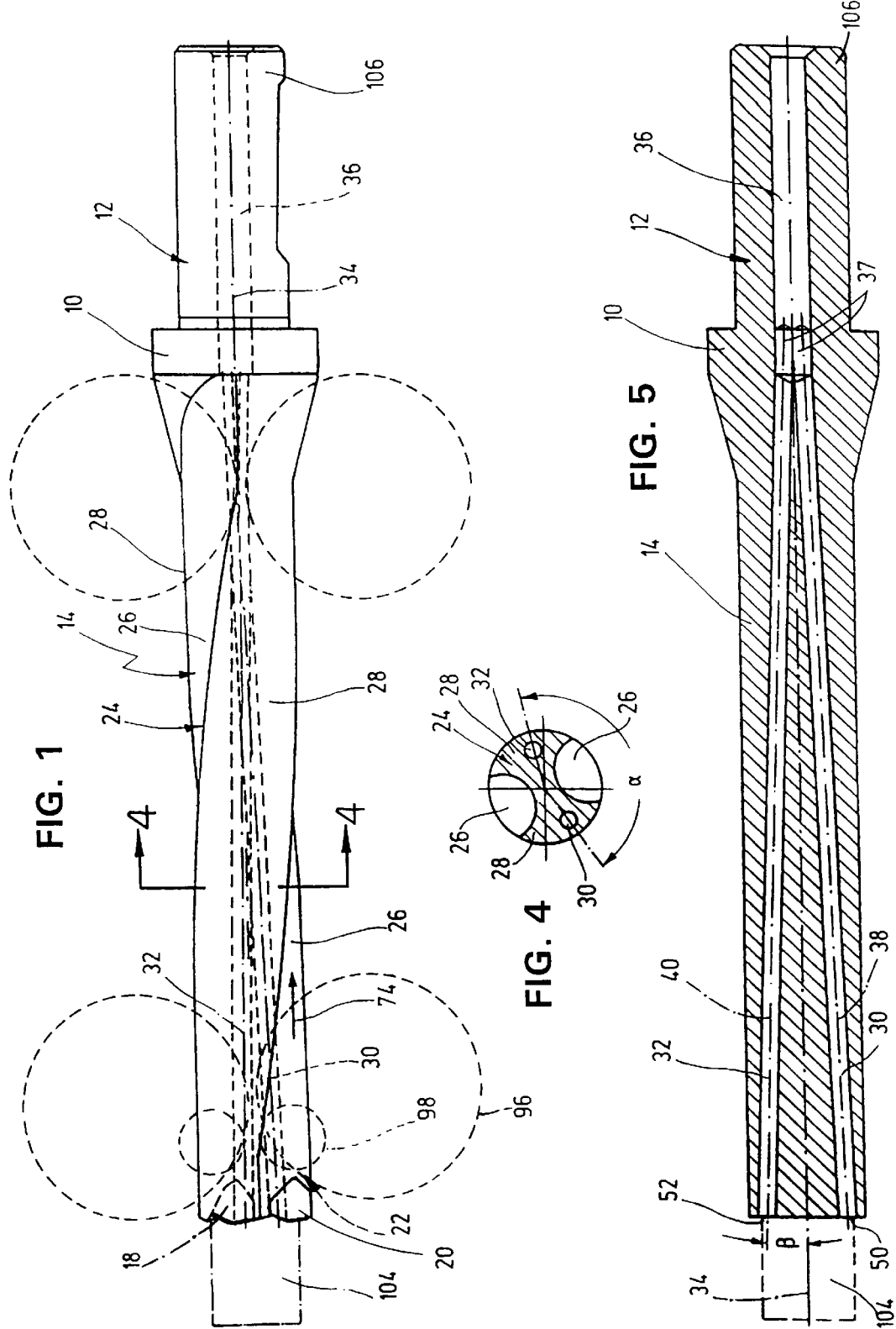

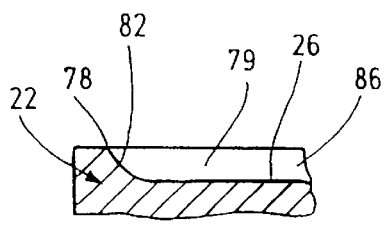
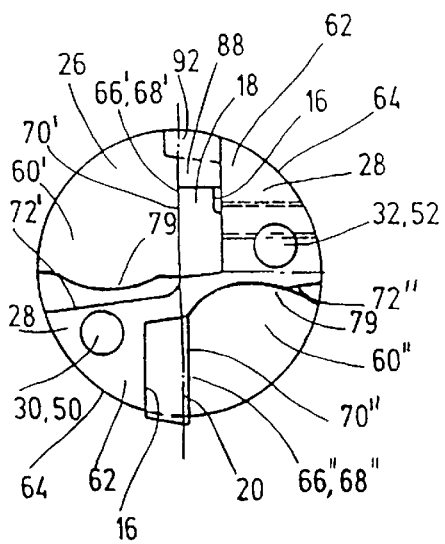
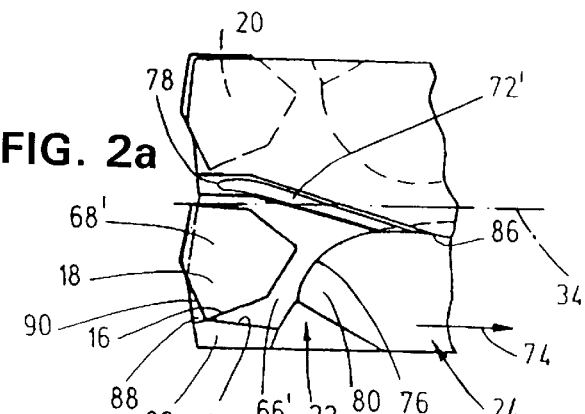
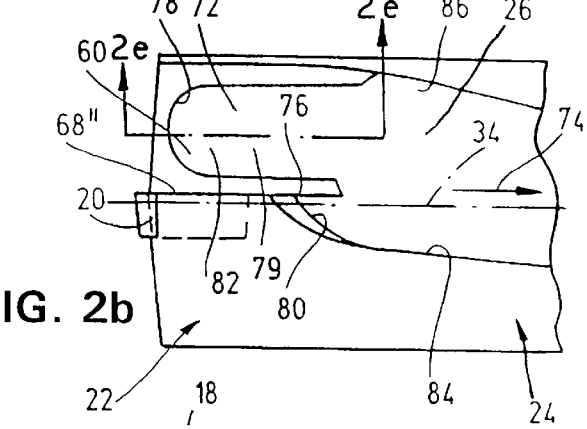
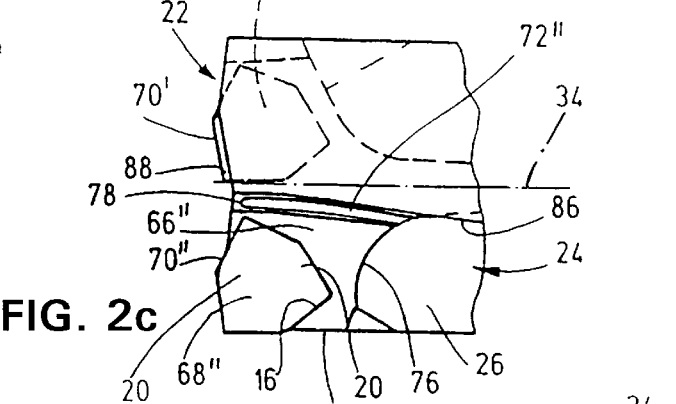

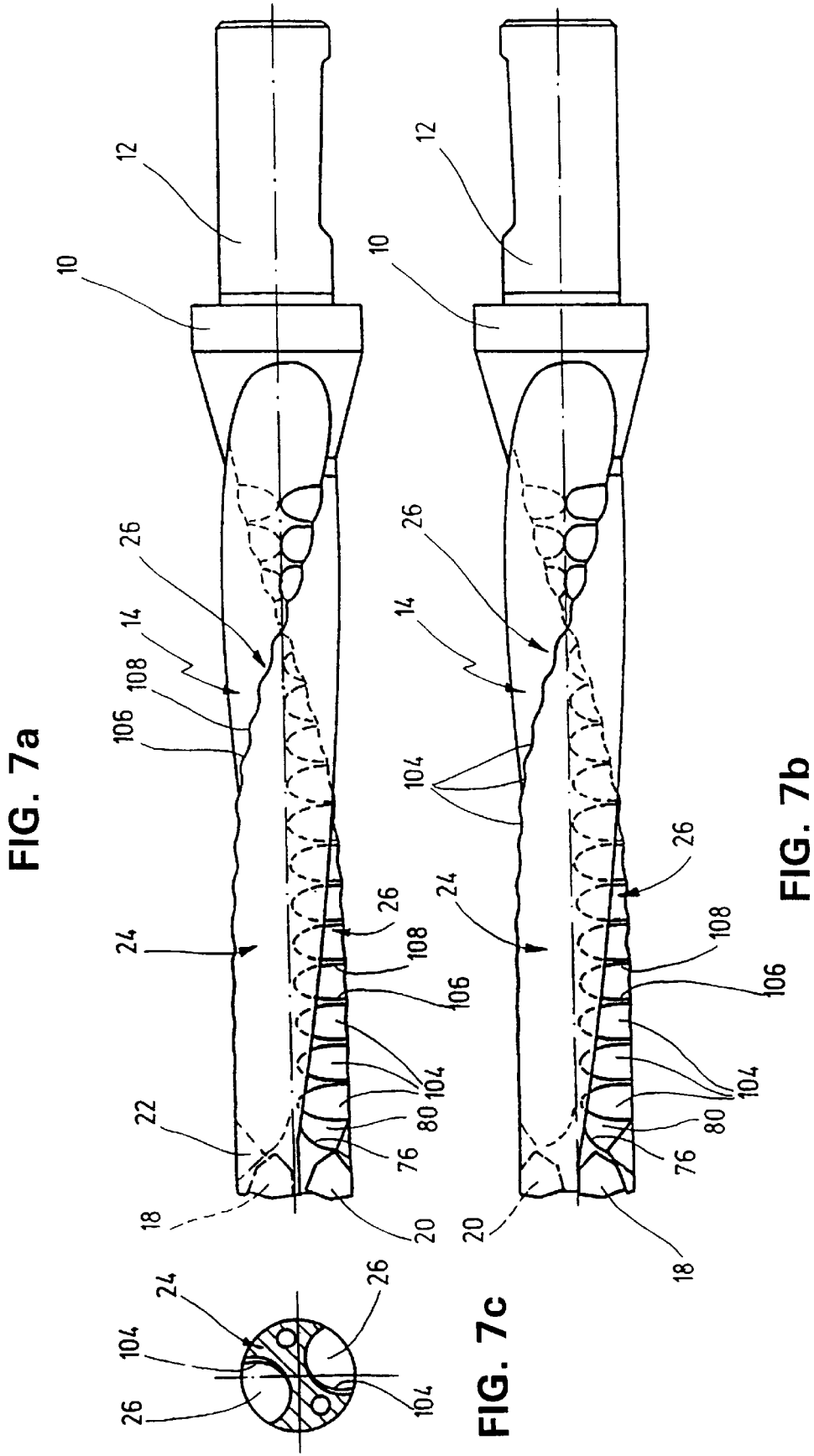

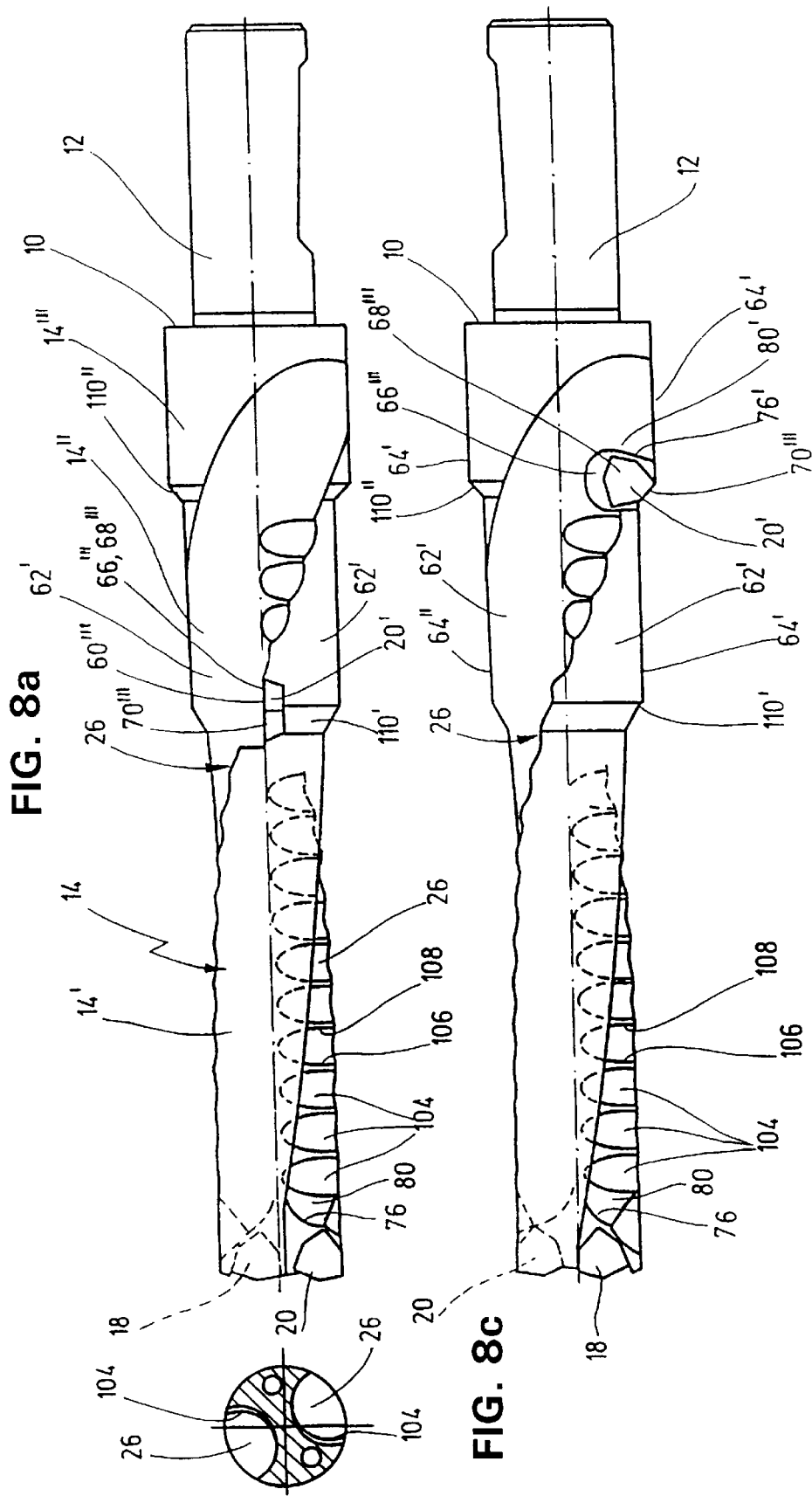

DRILLING TOOLS FOR MACHINE TOOL AND METHOD OF PRODUCING THE SAME

FIELD OF THE INVENTION

The invention is related to a drilling tool for machine tools and a method for the production thereof.

BACKGROUND OF THE INVENTION

A drilling tool of this type is known, which comprises a drill body having at least two chip transport grooves which are delimited at their flanks by helical ribs and a cutting head which is disposed at the front face side of the drill body. The cutting head has two segment portions which are radially outwardly delimited by partially cylindrical circumferential surfaces and which are seperated from each other by chip spaces which end in the adjacent chip transport grooves in the direction of chip flow and which are aligned essentially parallel to the tool axis. Further, the cutting head comprises at least two cutting inserts which are each disposed in a recess of the segment portions in the region of an essentially axially parallel radial chip breaker face, preferably with the face aligned to this, and which each have at least one active cutting edge which protrudes axially over the cutting head, wherein the chip breaker faces each end in a helical flank of the adjacent chip transport groove at a transition point in the direction of chip flow.

By a specific alignment of the cutting inserts which partially overlap in the active region of their cutting edges it is ensured that the lateral forces present at the cutting edges during drilling are essentially compensated by each other, so that a bore may be made in a workpiece essentially without guidance. The chip spaces, which extend axially parallel in the cutting head and which have a triangular cross section, merge in the direction of chip flow into a comparatively steep helical chip transport groove, which is also of triangular cross section. The chip transport grooves are delimited at their edges by ribs which on the one hand serve to guide the drill within the bore and on the other hand serve to delimit the chip transport grooves. The chips are mainly forced out through the chip transport grooves under the action of a coolant and lubricant which is supplied through the drill body. By the design of the ribs to be relatively broad it is attempted to prevent that the chips exit the chip transport grooves and distribute themselves over the circumference of the drill body, since this could cause the chips to be fused to the bore wall and the drill body, damaging the bore and the drilling tool. A further problem consists in that the chip space forms in the region of the cutting inserts, which are displaced radially inwards with respect to the circumference, a chip space of triangular cross section which tapers in the direction of chip flow in a funnel-like fashion. This leads to the circumstance that the chips may be formed to be relatively broad upon their creation and then have to be forced into the chip transport groove necessitating deformation work. By this a large part of the thrust imparted to the chips during the cutting process is lost in deformation work. Furthermore, the deformation forces are partially converted into transverse forces, which causes a radial deflection of the drilling tool and therefore a degradation of the drilling efficiency and bore quality.

Based on this it is an object of the invention to develop a drilling tool which ensures an efficient and nearly lateral force-free chip flow, and which therefore may be used to create comparatively deep bores. A further object of the invention is to develop a method for the production of the drilling tool according to the invention.

SUMMARY OF THE INVENTION

The solution according to the invention is based foremost on the recognition that a chip deformation, which leads to a chip compression and lateral forces, must be avoided in the region of the chip spaces and the following chip transport grooves. In order to achieve this goal, the following features are proposed according to the invention:

A drill body,
- having at least two chip transport grooves which are delimited at their flanks by helical ribs,
- and comprising a cutting head which is disposed at the front face side of the drill body,
  - which cutting head has at least two segment portions which are radially outwardly delimited by partially cylindrical circumferential surfaces and which are seperated from each other by chip spaces which end in the adjacent chip transport grooves in the direction of chip flow and which are aligned essentially parallel to the tool axis
  - and at least two cutting inserts which are each disposed in a recess of the segment portions in the region of an essentially axially parallel radial chip breaker face, preferably with the face aligned to this, and which each have at least one active cutting edge which protrudes axially over the cutting head,
- wherein the chip breaker faces each end in a helical flank of the adjacent chip transport groove at a transition point in the direction of chip flow,
- wherein a transition face is located at at least one of the transition points, which transition face recedes step-like from a limiting edge of the chip breaker face while broadening the cross section of the chip space and which ends in a flank of the adjacent chip transport groove,
- wherein the chip spaces have a chip guide face disposed at the adjacent segment portion, which is positioned opposite the chip breaker face at the side of the cutting insert and which, in a cross section through the chip space, includes an angle of 0° to 110° with the chip breaker face,
  - which chip guide face has a transition face at at least one of the transition points, which transition face recedes step-like in the chip flow direction from a limiting edge of the chip guide face while broadening the cross section of the chip space and which ends in one flank of the adjacent chip transport groove,
  - which limiting edge extends into the region between the active cutting edge and the middle of the adjacent cutting insert, so that the cross sectional surface of the chip space continually increases from the tip of the cutting head to the chip transport groove,
- wherein the drill body has a drill shank at its end opposite the cutting head, which shank is free of ribs and has a central coolant supply duct,
- wherein coolant ducts are located in the ribs of the drill body, which coolant ducts are helically curved with the same curvature as the ribs and extend from the cutting head over the entire length of the ribs with a constant slant angle β with respect to the tool axis and end in the central supply duct in the region of the ribless drill shank,
- and wherein the helix pitch of the chip transport grooves and therewith also the width of the chip transport grooves increases continuously or step-like in the chip flow direction.

The transition faces in the region of the chip breaker faces and the chip guide faces ensure that a thrust force which aids the chip removal is imparted to the chips created in the chip space upon their transition into the chip transport groove, without causing a chip deformation or chip compression.

In a drilling tool which is formed to be a stepped drill the drill body comprises at least two staggered portions which are axially seperated from one another by a cutting crown and which have a step-like increasing diameter in the direction of chip flow. The cutting crown comprises two segment portions which are delimited radially outwardly by partially cylindrical circumferential surfaces and comprises at least one cutting insert which is disposed in a recess of one of the segment portions in the region of an essentially axially parallel radial chip breaker face, preferably with its face aligned with respect to this, and which has at least one active cutting edge axially protruding over the cutting crown, wherein the corresponding chip breaker face ends at a transition point in the direction of chip flow in a helically curved flank of the adjacent chip transport groove, and wherein a transition surface is located at the transition point, which transition surface recedes step-like in the direction of chip flow from a limiting edge of the chip breaker face while broadening the cross section of the chip space and ends in one flank of the adjacent chip transport groove.

The stepped transition faces expediently extend over the entire width of the chip breaker face and/or of the chip guide face and are curved concavely in the direction of chip flow, so that they merge smoothly into the corresponding flank of the chip transport groove.

In order to improve the chip flow it is proposed according to an alternative or preferred embodiment of the invention that at least in the flank of the chip transport grooves at the cutting insert side a plurality of step surfaces or wave surfaces which recede from a stepped edge or wavy edge extending radially or slanted with respect to the tool axis in the direction of chip flow with a local broadening of the cross section of the chip transport groove are disposed at an axial distance from each other. In this, the individual step surfaces or wave surfaces are delimited at their chip flow sided end by a further stepped edge or wavy edge extending radially or slanted with respect to the tool axis, wherein the individual step surfaces or wave surfaces have in the direction of chip flow a gradient which initially increases and then decreases with respect to the helix pitch of the corresponding groove flank. The step surfaces or wave surfaces may be formed by depressions in the flanks of the chip transport grooves on the cutting insert side, which depressions are either closed at their stepped edges or wavy edges or open-edged in a radially outwardly direction. The depressions may have essentially any contour at their stepped edges or wavy edges, preferably an oval, circular or rectangular contour. The stepped or wavy edges ensure that a thrust force which aids the chip flow is imparted to the chips within the chip transport grooves, without the occurrence of chip deformation or compression.

In order to prevent the chips from exiting the chip transport grooves to the circumferential region of the ribs, it is proposed according to an alternative or preferred embodiment of the invention the flanks of the chip transport grooves have an included angle, as seen in cross section near their outer edges, of less than 90°, preferably of 0° to 30°. To this end it is of advantage when the chip transport grooves have a contour which is partially circular in cross section, preferably semicircular, wherein the cross section contour of the chip transport grooves extends in a straight line toward their outer edge at least in the region of one flank.

In order to improve chip flow, the chip space should be kept relatively short in the region of the cutting inserts up to the transition point. It is therefore expedient when the preferably curved limiting edge has along the length of its edge a variable distance from the edge of the cutting insert recess, which corresponds to 0.1 to 0.4 times the diameter of the limiting circle of the cutting insert. The partially cylindrical circumferential surfaces of the segment portions and the partially cylindrical circumferential surfaces of the ribs adjoining in the chip flow direction expediently supplement each other to form a common circumferential cylinder interrupted by the chip spaces and by the chip transport grooves.

In order to ensure that the chips also cannot be deflected out of the chip spaces through the gaps remaining between the overlapping cutting edges to the circumferential surface of the drill, a chip breaker face section is proposed according to a preferred or alternative solution of the invention, which extends at the face side past a cutting edge portion which lies within the mutually overlapping active portions. This problem occurs mainly in the chip space which belongs to a cutting insert which is displaced radially inwards, so that the chip breaker face section should extend past a radially outward positioned cutting edge portion of the radially innermost cutting insert. Generally it is also possible that the chip breaker face section extends at the face side past a radially inward positioned cutting edge portion of a radially outermost cutting insert, in order to bridge a gap located there.

According to a further preferred or alternative solution of the invention there is provided a chip breaker face limit which adjoins the partially cylindrical circumferential surface of a segment portion and extends from the cutting head tip or cutting crown tip in the direction of the transition point and which extends in the direction of the chip space past the plane of the face of a cutting insert which is displaced radially inwards with respect to the circumference. This effectively prevents that the chips created at the cutting edge are deflected toward the partial-cylindrical circumferential surface. The chip breaker face limit may protrude step-like or wedge-shaped over the plane of the face in a radial section. Additionally, the chip breaker face limit may protrude step-like or wedge-shaped over the plane of the face in an axial section and diverge in the direction of chip flow under broadening of the chip space, so that chip flow to the adjacent chip transport groove is made easier.

In order to be able to provide chip transport grooves in the drill body which are as deep as possible and which have a large cross section for the passage of chips, it is of advantage when in a drill body having a ribless drill shank which has a central coolant supply duct the coolant ducts leading to the cutting head or crown are arranged within the ribs such that they are helically curved with the same curvature as the ribs and extend from the cutting head over the entire length of the ribs with a constant slant angle with respect to the tool axis and end in the central supply duct in the region of the ribless drill shank. In order to make their production easier, the coolant ducts form straight deep-hole bores which extend slanted with respect to the tool axis in a deconvoluted state of the ribs. The slant angle of the deep-hole bores with respect to the drilling tool axis is 1° to 8°, depending on the diameter and length of the drill body. Advantageously the deep-hole bores lie in an axial plane which extends through the tool axis in the deconvoluted state of the ribs, wherein the axial planes containing the two deep-hole bores include an angle different from 180° about the tool axis. The angle included by the axial planes expediently is 155° to 175°.

With these measures a constant cross section change and therefore an increased rigidity and improved vibration damping is achieved. The mass distribution over the cross section can also be influenced by the angle included between the axial planes. Due to the design and arrangement of the coolant ducts according to the invention deep chip transport grooves can be provided along the total length of the chip flow portion. The coolant ducts are arranged in a manner which is beneficial with respect to flow properties. The slanted alignment with respect to the drill axis results in a centrifugal force supported flow in the direction of the exit point.

A method for producing the drill tool according to the invention comprises the following steps:

- a raw material body is machined to the drill tool shape, thereby forming a rotationally symmetrical, in sections cylindrical blank body which may have a plurality of stepped portions having different diameters;
- two opposing chip transport grooves are formed or milled into a cylindrical section (chip flow portion) of the blank body which are axially delimited to both sides by a runout end, which chip transport grooves are delimited at their flanks by remaining longitudinal ribs;
- at the end of the blank body at the cutting head or cutting crown side two chip spaces are formed or milled, which are delimited at their flanks by an essentially axially parallel chip breaker face and a chip guide face, the chip breaker face and/or chip guide face of which cut across the flanks of the adjacent chip transport groove in the region of the runout end at the cutting head or cutting crown side or within the cutting head, thereby forming a limiting edge and a step-like receding transition surface;
- the chip transport grooves are formed or milled into the blank body or its stepped portions initially in the form of axially parallel longitudinal grooves;
- before or after the forming or milling process deep-hole bores are machined into the region of the straight ribs, which extend slanted with respect to the cylinder axis of the blank body from points which are positioned eccentrically on the face of the cutting head or cutting crown side of the blank end in the direction of a central blind bore in the ribless drill shank and penetrate its bottom;
- the blank prepared in this manner is clamped at bearing points which are axially spaced with respect to each other and heated to a predetermined temperature in a ribbed zone which is located between the bearing points and subjected to a coaxial torsion moment and thereby helically twisted by a predetermined angle in the heated zone;
- wherein the twisting angle is varied in the region of the ribs, forming an axially continuous or step-like increasing helical pitch.

In this, the chip transport grooves can be machined into the blank body by means of a side milling cutter and/or a cherry, wherein initially a concave transition surface corresponding to the toroidal shape of the side milling cutter and/or the spherical shape of the cherry is created at the runout ends at the cutting head or cutting crown side. This way chip grooves having a partial-circular cross section or a different contour can be milled, which have a straight runout toward the groove edge at least at the groove flank at the cutting insert side. In order to increase the rigidity of the drill body especially in the vicinity of its clamping location at the drill shank, it is proposed according to a preferred embodiment of the invention that the longitudinal grooves are milled into the cylindrical blank body with a depth which decreases in the direction of chip flow. In order to be able to mill deep grooves extending up to the vicinity of the drill axis, it is of advantage when the chip transport grooves are initially milled into the blank body in the form of axially parallel longitudinal grooves and when deep-hole bores are made in the region of the straight ribs before or after the milling operation, which bores extend slanted with respect to the cylinder axis of the blank body from locations which are eccentrically positioned on the face of the blank body end on the cutting head or crown side in the direction of a central blind bore in the ribless drill shank, penetrating the bottom thereof. The blank prepared in this manner may be heated to a predetermined temperature at a ribbed zone located between two axially spaced bearing locations and be subjected to a coaxial torsion force, thereby helically twisting the heated zone by a predetermined angle.

According to a preferred embodiment of the invention the blank the blank body is twisted with a continuously or step-wise displaced heating zone in the region between the bearing points. In this way the twist angle may be varied under formation of an axially variable helix pitch.

A further preferred embodiment of the invention provides that step surfaces or wave surfaces which are spaced at an axial distance from each other and are delimited by essentially radially extending edges are milled at least into the groove flanks at the cutting insert side, preferably by means of a cherry. It is then of advantage when this is performed before the helical twisting of the blank body.

BRIEF DESCRIPTION OF THE DRAWINGS

In the following the invention is further described with reference to the drawing, in which:

FIG. 1 shows a side view of a drilling tool with indexable cutting inserts and helical coolant ducts;

FIG. 2a to 2d show four enlarged side views, rotated through 90° with respect to each other, of the cutting head;

FIG. 2e shows a section along the line E—E in FIG. 2b;

FIG. 3 shows a front view of the cutting head;

FIG. 4 shows a section along the line IV—IV of FIG. 3;

FIG. 5 shows a longitudinal section through a blank for a drilling tool according to FIG. 1 to 4;

FIG. 7a to 7c show two side views and a sectional view of a drilling tool having helical chip transport grooves which are wavy in the direction of chip flow;

FIG. 8a to 8c show a stepped drill in a representation corresponding to FIG. 7a to 7c;

DETAILED DESCRIPTION

Figure 6A:
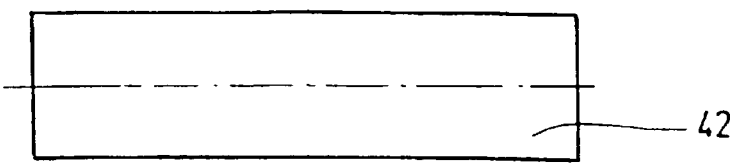
FIG. 6a to 6h show a process scheme for the production of the drilling tool.
Figure 6B:
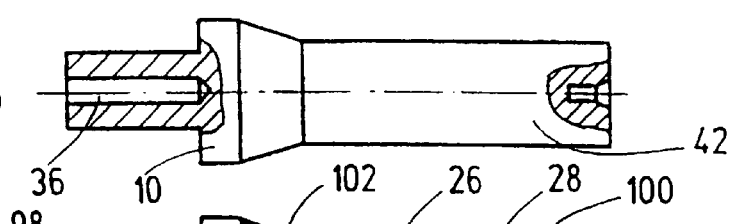
Figure 6C:
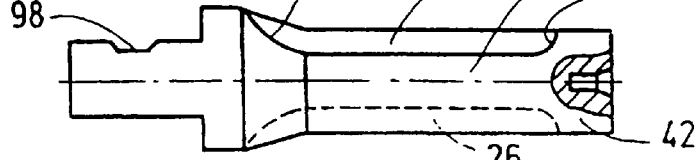
Figure 6D:
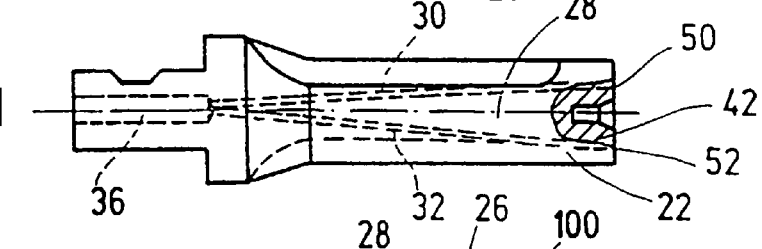
Figure 6E:
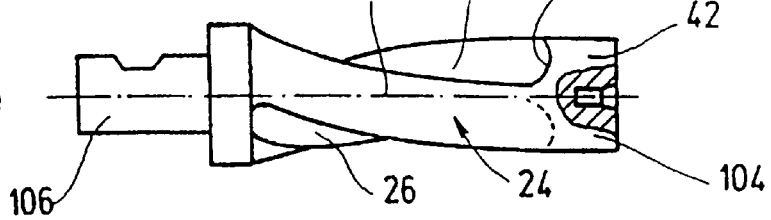
Figure 6F:
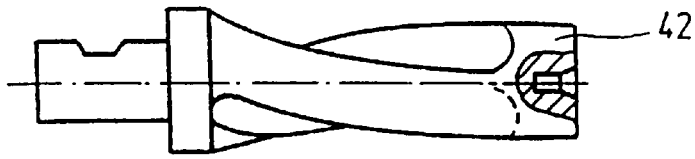
Figure 6G:
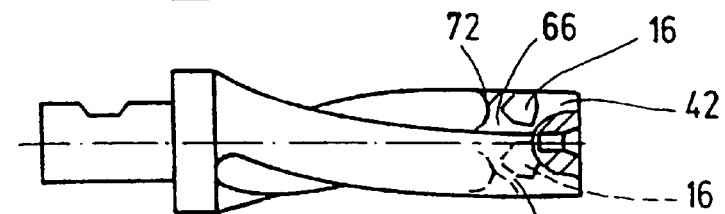
Figure 6H:
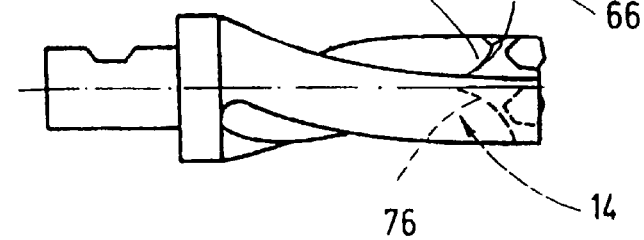
Figure 9A:
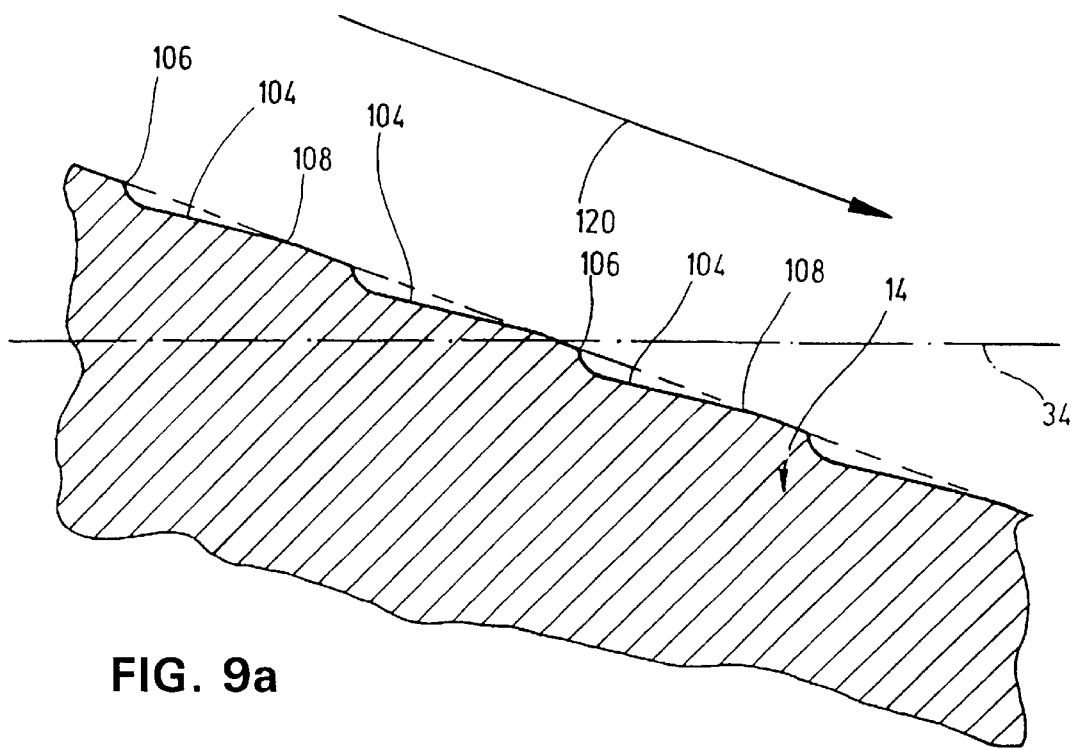
FIG. 9a and b show a detail of the flanks of the chip transport grooves on the cutting insert side, with stepped faces and wavy faces in an enlarged representation cut in the direction of chip flow.
Figure 9B:
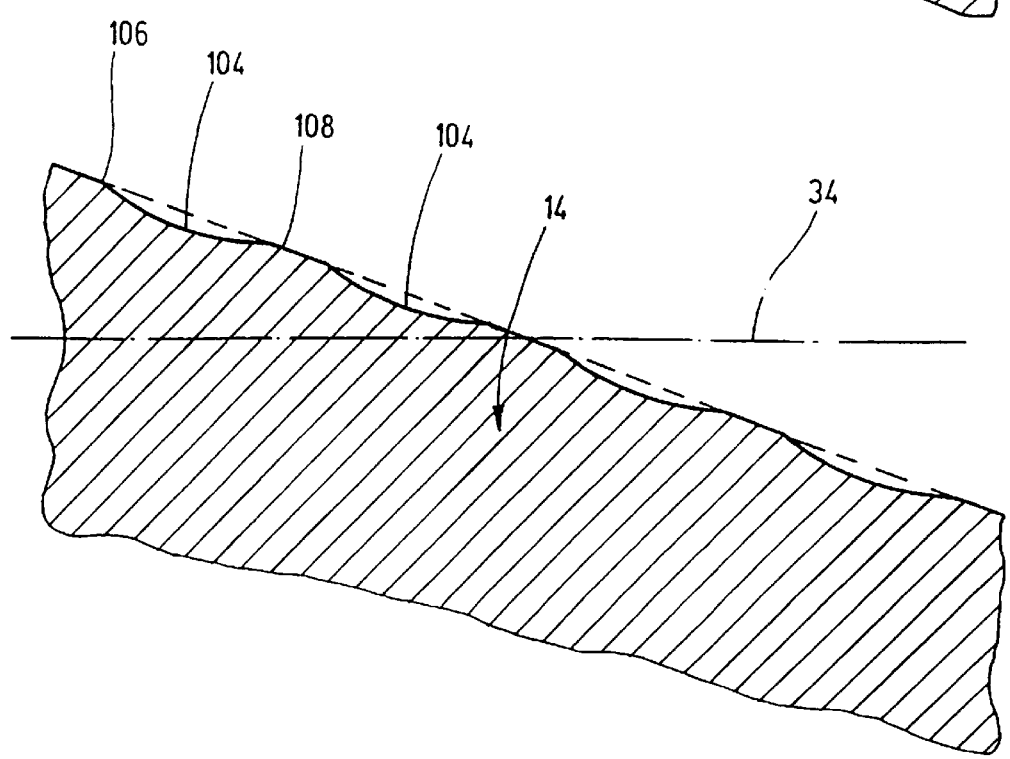

The drilling tool essentially consists of a drill shank 12 which is adapted to be clamped in a tool holder (not shown) and which has a collar 10 acting as a stop for the tool holder, and a drill body 14 which comprises a cutting head 22 on its face side, which cutting head is provided with recesses 16 for a radially inner indexable cutting insert 18 and a radially outer indexable cutting insert 20, and a helical chip removal portion 24 which extends from the cutting head 22 to the collar 10. The chip removal portion has two oppositely arranged chip transport grooves 26 which are delimited at their flanks by two helically twisted ribs 28. Further, two coolant ducts 30, 32 are arranged in the chip removal portion 24, which ducts are helically twisted with the same pitch as the ribs 28, extend along the ribs over the whole helical chip removal portion 24 with a constant slant angle β with respect to the drill axis 34, and end in a common axially centered supply duct 36 in the drill shank 12 in the region of the collar 10. The central supply duct 36 extends within the drill shank 12 up to the region of the thickened collar 10. Its flow cross section is at least twice as large as that of the coolant ducts 30, 32. As can be seen especially from FIG. 5, the coolant ducts 30, 32 open into the supply duct 36 at radially offset transition points 37. In the blank state of the ribs 28 (FIG. 5)the axes 38, 40 of the deep-hole bores which form the coolant ducts each lie in an axial plane which cutting through the bore axis or blank axis 34, respectively, which axial planes include an angle α≠180° about the drill axis 34 (cf. FIG. 4).

The cutting head 22, which is integrally connected to the drill body 14 in the embodiment shown, comprises two segment portions 62 which are separated from one another in a circumferential direction by axially aligned chip spaces 60', 60", which segment portions are radially outwardly delimited by partial-cylindrical circumferential surfaces 64. The indexable cutting inserts 18, 20 are disposed in the region of the axially parallel, radial chip breaker faces 66', 66" of the chip spaces 60', 60", the faces 68', 68" of which cutting inserts are aligned with the corresponding chip breaker face 66', 66" and the active cutting edges 70', 70" of which protrude over the front face of the drill head 22. The cutting edge 70" of the outer cutting insert 20 radially protrudes by a small amount over the circumferential surface 64 of the corresponding segment portion 62 and determines the bore diameter.

The chip spaces 60', 60" of the drill head 22 additionally comprise a chip guide face 72', 72" disposed at the adjacent segment portion 62, which is located opposite the chip breaker face 66', 66" on the cutting insert side.

The chip breaker faces 66', 66" end in the direction of chip flow 74 in a limiting edge 76 which is designed to be a flank edge, which is joined by a step-like receding transition face 80 which merges into the adjacent flank 84 of the chip transport groove 26 with a concave curvature under broadening of the chip space cross section.

A depression 79 is machined, for example by means of an end milling cutter, into each of the the chip guide faces 72', 72", which extends to the vicinity of the front tip of the drill body 14 and which has at its front face limiting edge 78 a step-like receding transition face 82 having a concave curvature, and which merges smoothly into the adjacent flanks 86 of the chip transport groove 26 in the direction of chip flow. The limiting edge 78 extends into the region between the active cutting edge 70', 70" and the center of the adjacent cutting insert 18, 20, so that the cross sectional area of the chip space 60', 60" increases constantly from the tip of the cutting head 22 to the chip transport groove 26.

As can be seen especially from FIG. 2a, c, d, and 3, a chip breaker face section 88 is provided in the region of the chip breaker face 66' belonging to the innermost cutting insert, which extends over the radially outermost cutting edge portion 90 of the inner cutting insert 18, which portion 90 lies within the overlapping active regions of the cutting inserts 18, 20. By this it is prevented that chips are deflected into the region of the circumferential surface 64 through the gusset between the cutting edge portion 90 and the bore, which gusset is formed during the drilling operation. Additionally a chip breaker face limit 92 which extends from the cutting head tip to the vicinity of transition point is provided in the region of the chip breaker face 66', which projects in a radial and axial section in a step-like or wedge-like manner over the plane of the chip face 68' of the cutting insert 18 in the direction of the chip space 60' (FIG. 2d and 3). As can be seen from FIG. 2a, the inner edge 94 of the chip breaker face limit 92 extends slanted outwards in the direction of chip flow under broadening of the chip space 60'.

Figure 10A:
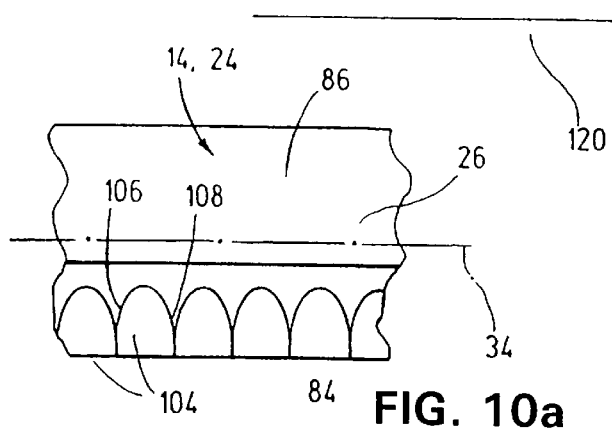
FIG. 10a to 10h show details of the chip transport groove with differently designed contours of the stepped or wavy faces.
Figure 10E:
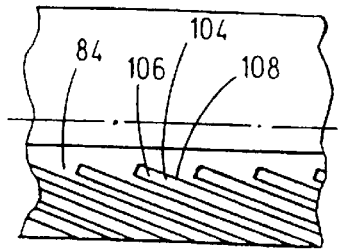
Figure 10B:
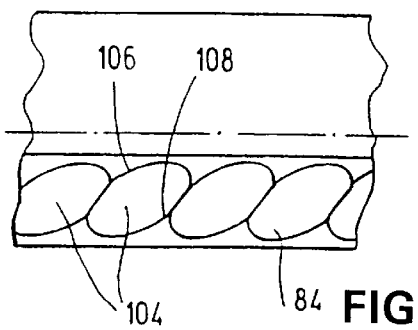
Figure 10F:
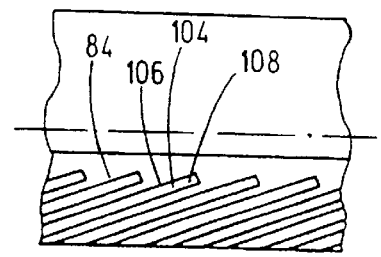
Figure 10C:
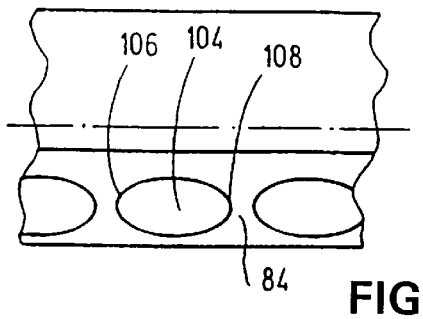
Figure 10G:
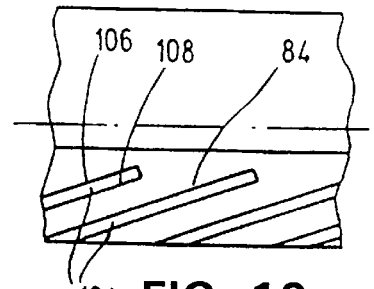
Figure 10D:
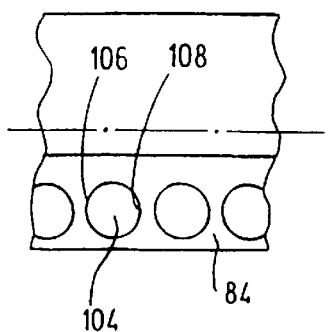
Figure 10H:
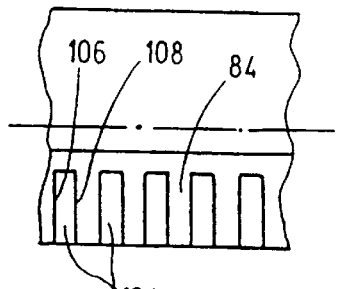

In the embodiments shown in FIG. 7 to 10 a plurality of stepped or wavy surfaces 104 which are disposed at an axial distance from each other are provided in the flanks 84 of the chip transport grooves 26 on the cutting insert side, which surfaces are delimited by edges 106, 108 which are aligned essentially radially (FIG. 7, 8, 10a, h) or slanted with respect to the drill axis 34 (FIG. 10b, e, f, g). The stepped or wavy surfaces 104 jut back from the edges 106 at the cutting head side in the direction of chip flow 120 under local broadening of the cross section, and have an angle of ascent which initially increases and then decreases in the direction of chip flow with respect to the helix pitch of the corresponding groove flank 84 (cf. FIG. 9a and b).

In the embodiments shown in FIG. 10a to h the stepped or wavy surfaces 104 are formed by depressions in the flanks 84 of the chip transport grooves 26 which are closed at their edges 106, 108 (FIG. 10b, c, d) or open radially outwards (FIG. 10a, e to h). The depressions may for instance have an oval (FIG. 10a, b, c), circular (FIG. 10d) or rectangular (FIG. 10e to h) outline at their stepped or wavy edges 106, 108. They may be disposed spaced with respect to each other (FIG. 10c to h) or be adjacent to each other with their edges 106 and 108 (FIG. 10a) or they may overlap (FIG. 10b). In the embodiment shown in FIG. 8a to c the drilling tool is designed to be a stepped drill. The drill body 14 comprises three step portions 14', 14", 14''' which have diameters increasing in steps in the direction of chip flow and which are axially separated from each other by cutting crowns 110', 110". The cutting crowns 110', 110" comprise two segment portions 62' which are radially outwardly delimited by partial-cylindrical circumferential surfaces 64', 64" and which are separated from each other by chip spaces 60''' which are aligned essentially parallel to the axis of the tool and which merge into the neighboring chip transport grooves 26 in the tool feed direction as well as in the direction of chip flow. The cutting crowns 110', 110" further each comprise a cutting insert 20' having an active cutting edge 70''' which protrudes axially over the cutting crown 110', 110" and which is disposed in a recess of a segment portion in the region of an essentially axially parallel chip breaker face 66''' with its face 68''' aligned thereto. The chip breaker face 66''' merges at a transition point in the direction of chip flow into a helically curved flank of the adjacent chip transport groove 26. A transition face 80 which recedes step-like from a limiting edge 76' of the chip breaker face 66''' in the direction of chip flow under broadening of the cross section of the chip space and which merges into the one flank 84 of the adjacent chip transport groove 26 is located at the transition point.

As can be seen from the scheme of FIG. 6, the production of the drilling tool entails the folowing steps:

The cylindrical blank body 42' is turned in a lathe to yield the drill contour and provided with the conical transition to the collar 10. With the blank still in the lathe, the central bore which forms the supply duct 36 is machined from the shank side up to the region of the collar 10 (blank 42").

Then the blank 42" prepared in this manner is mounted in a milling station, where the opposing chip grooves 26 are machined by means of a side milling cutter 96 and a cherry 98 (cf. FIG. 1), leaving the longitudianl ribs 28. The chip grooves 26 are machined to have a profile which is circular in cross section with spherical or toroidal runout ends 100, 102. In the milling station the clamping surface 98 is also machined into the drill shank (blank 42'"). In the instance of the embodiment of FIG. 7 and 8, the stepped or wavy surfaces 104 may also be machined into the flanks of the chip grooves 26 on the cutting insert side by means of a side milling cutter.

The blank 42'" prepared in this manner is provided, in the same clamping or in a separate drill station, with deep-hole bores 30, 32 which penetrate the longitudinal ribs 28 from the front side exit points 50, 52 in the drill head 22 to the supply duct 36 (blank$^{IV}$).

The blank 42$^{IV}$ prepared in this manner is clamped at both ends 104, 106 in a twisting station and heated in zones by means of an induction coil which is moved along the chip removal portion 24 of the drill body 14, and is subjected to a coaxial torsional moment by way of the clamping points. By this the chip removal portion 24 together with the bores 30, 32 is successively helically twisted, wherein the helix angle may be varied during the twisting process. By means of a cooling blower which is disposed behind the induction coil it is ensured that the previously twisted portions of the chip removal portion are hardened during the subsequent twisting process (blank 42$^V$).

In order to compensate the form errors created during the twisting process the blank 42$^V$ is once again machined in a lathe to form the blank 42$^{VI}$.

In a final machining station the chip breaker faces 66', 66", the chip guide faces 72', 72", and the insert seats 16 are milled (blank 42$^{VII}$). Lastly the head shape is milled, thereby forming the finished drill body 14.

In summary the following is to be stated: The invention is related to a drilling tool for machine tools. The drilling tool comprises a drill body 14 having two chip transport grooves 26 which are delimited at their flanks by helical ribs 28. A cutting head 22 is disposed at the front face side of the drill body 14, which cutting head has two segment portions 62 which are seperated from each other by two opposing, axially aligned chip spaces 60', 60", and two cutting inserts 18, 20 which are each disposed in a recess 16 of the segment portions in the region of an axially parallel radial chip breaker face 66', 66" at different radial distances from the drill axis 34 with partially overlapping active regions. The chip breaker faces 66', 66" end in the flanks 84 of the adjacent chip transport grooves 26 at a transition point, wherein a transition surface 80 which merges into a flank of the adjacent chip transport groove 26 and which recedes step-like under broadening of the cross section of the chip space 66', 66" is diposed at at least one of the transition points.

We claim:

1. A drill tool for machine tools comprising a drill body having at least two chip transport grooves which are delimited at their flanks by helical ribs, and comprising a cutting head which is disposed at a front face side of the drill body, the cutting head having at least two segment portions which are radially outwardly delimited by partially cylindrical circumferential surfaces and which are separated from each other by chip spaces which end in the adjacent chip transport grooves in a direction of chip flow and which are aligned essentially parallel to a tool axis, and at least two cutting inserts which are each disposed in a cutting insert recess of the segment portions in a region of respective essentially axially parallel radial chip breaker faces and the cutting inserts each having at least one active cutting edge which protrudes axially over the cutting head, wherein the chip breaker faces each end in a helical flank of the adjacent chip transport groove at a transition point in the direction of chip flow, wherein a first transition face is located at at least one of the transition points, which transition face recedes step-like from a first limiting edge of the chip breaker face while broadening a cross section of the chip space and which ends in a flank of the adjacent chip transport groove, wherein the chip spaces each have a chip guide face disposed at the adjacent segment portion, which is positioned opposite the respective chip breaker face at the side of the cutting insert and which, in a cross section through the chip space, includes an angle of 0° to 110° with the chip breaker face, the chip guide face having a second transition face at at least one of the transition points, the second transition face receding step-like in the chip flow direction from a second limiting edge of the chip guide face while broadening the cross section of the chip space and ending in a second flank of the adjacent chip transport groove, the second limiting edge extending into the region between the active cutting edge and the middle of the adjacent cutting insert, so that the cross sectional surface of the chip space continually increases from the tip of the cutting head to the chip transport groove, wherein the drill body has a drill shank at its end opposite the cutting head, said shank free of ribs and having a central coolant supply duct, wherein second and third coolant ducts are located in the ribs of the drill body, said second and third coolant ducts are helically curved with the same curvature as the ribs and extend from the cutting head over the entire length of the ribs with a constant slant angle (β) with respect to the tool axis, and end in the central supply duct in the region of the ribless drill shank, and wherein the helix pitch of the chip transport grooves and the width of the chip transport grooves increase continuously or step-like in the chip flow direction.

2. The drill tool of claim 1, wherein at least some of the cutting inserts are located at different radial distances from the tool axis and have partially overlapping active regions.

3. The drill tool of claim 2, wherein the cutting edge of the at least one radially most outwardly positioned cutting insert radially protrudes over the corresponding partially cylindrical circumferential surface.

4. The drill tool of claim 1, wherein the drill body comprises at least two staggered portions which are axially separated from one another by a cutting crown and which have a step-like increasing diameter in the direction of chip flow, the cutting crown comprising two cutting crown segment portions which are delimited radially outwardly by partially cylindrical circumferential cutting crown surfaces and comprising at least one cutting crown insert which is disposed in a recess of one of the cutting crown segment portions in the region of an essentially axially parallel radial cutting crown chip breaker face and the cutting crown insert having at least one active cutting edge axially protruding over the cutting crown, wherein the corresponding chip breaker face ends at a transition point in the direction of chip flow in the flank of the adjacent chip transport groove.

5. The drill tool of claim 1, wherein the transition faces are curved concavely.

6. The drill tool of claim 1, wherein the transition faces merge smoothly into the respective flanks of the chip transport grooves.

7. The drill tool of claim 1, wherein the transition faces extend over the entire width of the respective chip breaker faces.

8. The drill tool of claim 1, wherein the flanks of the chip transport grooves include in cross section near their outer edges an angle of less than 90°.

9. The drill tool of claim 1, wherein the chip transport grooves have a contour which is semicircular in cross section.

10. The drill tool of claim 9, wherein the cross section contour of the chip transport grooves extends in a straight line toward their outer edge at least in the region of one of the flanks.

11. The drill tool of claim 1, wherein the first limiting edge has along a length of its edge a variable distance from the edge of the cutting insert recess, which corresponds to 0.1 to 0.4 times the diameter of a limiting circle of the cutting insert.

12. The drill tool of claim 1, wherein the partially cylindrical circumferential surfaces of the segment portions and the partially cylindrical circumferential surfaces of the ribs adjoining in the chip flow direction supplement each other to form a common circumferential cylinder interrupted by the chip spaces and by the chip transport grooves.

13. The drill tool of claim 2, wherein a chip breaker face section extends past a cutting edge portion which lies within the partially overlapping active portions.

14. The drill tool of claim 2, wherein the chip breaker face section extends past a radially outward positioned cutting edge portion of a radially innermost one of the cutting inserts.

15. The drill tool of claim 13, wherein the chip breaker face section extends past a radially inward positioned cutting edge portion of a radially outermost one of the cutting inserts.

16. The drill tool of claim 1, wherein a chip breaker face limit which adjoins the partially cylindrical circumferential surface of one of the segment portions extends from the cutting head tip in the direction of the transition point and extends in the direction of one of the chip spaces past the plane of a face one of the cutting inserts which is displaced radially inwards with respect to the circumferential surface.

17. A drill tool for machine tools comprising a drill body having at least two chip transport grooves which are delimited at their flanks by helical ribs, and comprising a cutting head which is disposed at a front face side of the drill body, the cutting head having at least two segment portions which are radially outwardly delimited by partially cylindrical circumferential surfaces and which are separated from each other by chip spaces which end in the adjacent chip transport grooves in a direction of chip flow and which are aligned essentially parallel to a tool axis and at least two cutting inserts which are each disposed in a cutting insert recess of the segment portions in a region of an essentially axially parallel radial chip breaker face and the cutting inserts each having at least one active cutting edge which protrudes axially over the cutting head, wherein the chip breaker faces each end in a helical flank of the adjacent chip transport groove at a transition point in the direction of chip flow, wherein a chip breaker face limit which adjoins the partially cylindrical circumferential surface of a segment portion and extends from a tip of the cutting head in the direction of the transition point and which extends in the direction of the chip space past the plane of a face of the cutting insert which is displaced radially inwards with respect to the circumferential surface.

18. The drill tool of claim 17, wherein the chip breaker face limit protrudes step-like or wedge-shaped over the plane of the face in a radial or axial section.

19. The drill tool of claim 17, wherein the chip breaker face limit diverges in the direction of chip flow while broadening the chip space.

20. The drill tool of claim 1, wherein at least in the flank of the chip transport grooves at a cutting insert side, a plurality of step surfaces or wave surfaces recede from a stepped edge or wavy edge extending radially or slanted with respect to the tool axis in the direction of the chip flow.

21. A drill tool for machine tools comprising a drill body having at least two chip transport grooves which are delimited at their flanks by helical ribs, and comprising a cutting head which is disposed at a front face side of the drill body, the cutting head having at least two segment portions which are radially outwardly delimited by partially cylindrical circumferential surfaces and which are separated from each other by chip spaces which end in the adjacent chip transport grooves in a direction of chip flow and which are aligned essentially parallel to a tool axis, and at least two cutting inserts which are each disposed in a recess of the segment portions in a region of respective essentially axially parallel radial chip breaker faces and the cutting inserts each having at least one active cutting edge which protrudes axially over the cutting head, wherein the chip breaker faces each end in a helical flank of the adjacent chip transport groove at a transition point in the direction of chip flow, wherein at least in the flank of the chip transport grooves at a cutting insert side, a plurality of step surfaces or wave surfaces recede from a stepped edge or wavy edge extending radially or slanted with respect to the tool axis in the direction of chip flow with a local broadening of the cross section of the chip transport groove, wherein the plurality of step surfaces or wave surfaces are disposed at an axial distance from each other.

22. The drill tool of claim 21, wherein the individual step surfaces or wave surfaces are delimited at a chip flow sided end by a further stepped edge or wavy edge extending radially or slanted with respect to the tool axis, wherein the individual step surfaces or wave surfaces have, in the direction of chip travel, a gradient which initially increases and then decreases with respect to a helix pitch of the corresponding flank.

23. The drill tool of claim 21, wherein the step surfaces or wave surfaces are formed by depressions in the flanks of the chip transport grooves on a cutting insert side, wherein the depressions are either closed at the stepped edges or wavy edges or open-edged in a radially outwardly direction.

24. The drill tool of claim 23, wherein the depressions have an oval or circular contour at the stepped edges or wavy edges.

25. The drill tool of claim 23, wherein the depressions have an opened-edged rectangular contour at their stepped edges or wavy edges.

26. The drill tool of claim 21, the drill body having at its end opposed to the cutting head a ribless drill shank which has a first central coolant supply duct, and second and third coolant ducts are located in the ribs of the drill body, and are helically curved with the same curvature as the ribs and extend from the cutting head over the entire length of the ribs with a constant slant angle (β) with respect to the tool axis and end in the central supply duct in the region of the ribless drill shank.

27. A drill tool for machine tools comprising a drill body, having at least two chip transport grooves which are delimited at their flanks by helical ribs, and comprising a cutting head which is disposed at the front face side of the drill body, the cutting head having at least two segment portions which are radially outwardly delimited by partially cylindrical circumferential surfaces and which are separated from each other by chip spaces which end in the adjacent chip transport grooves in a direction of chip flow and which are aligned essentially parallel to a tool axis, and at least two cutting inserts which are each disposed in a recess of the segment portions in a region of respective essentially axially parallel radial chip breaker faces and the cutting inserts each having at least one active cutting edge which protrudes axially over the cutting head, wherein the chip breaker faces each end in a helical flank of the adjacent chip transport groove at a transition point in the direction of chip flow, wherein the drill body has at its end opposed to the cutting head, a ribless drill shank which has a central coolant supply duct, and second and third coolant ducts are located in the ribs of the drill body, wherein the second and third coolant ducts are helically curved with the same curvature as the ribs and extend from the cutting head over the entire length of the ribs with a constant slant angle (β) with respect to the tool axis, so that they directly end in the central supply duct in the region of the ribless drill shank.

28. The drill tool of claim 27, wherein the second and third coolant ducts form straight deep-hole bores which extend slanted with respect to the tool axis in a deconvoluted state of the ribs.

29. The drill tool of claim 28, wherein the deep-hole bores lie in an axial plane which extends through the tool axis, wherein the axial planes containing the two deep-hole bores include an angle (α) different from 180° about the tool axis.

30. The drill tool of claim 29, wherein the angle (α) included by the axial planes is 155° to 175°.

* * * * *

UNITED STATES PATENT AND TRADEMARK OFFICE
CERTIFICATE OF CORRECTION

PATENT NO : 6 030 155
DATED : February 29, 2000
INVENTOR(S) : Gerhard SCHEER et al It is certified that error appears in the above-identified patent and that said Letters Patent are hereby corrected as shown below:

On the title page item [54]; change
"DRILLING TOOLS FOR MACHINE TOOL AND METHOD OF PRODUCING THE SAME" to
---DRILLING TOOL FOR MACHINE TOOLS AND METHOD OF PRODUCING THE SAME---.

On the title page item [73]; change Assignee's name
"Komet Praezisonswerkzeuge" to ---Komet Praezisionswerkzeuge---.

Column 11, line 52; change "face one" to ---face of one---.

Signed and Sealed this

Tenth Day of April, 2001

*Attest:*

NICHOLAS P. GODICI

*Attesting Officer*  *Acting Director of the United States Patent and Trademark Office*